United States Patent [19]

Martin et al.

[11] 4,338,159
[45] Jul. 6, 1982

[54] FINGER MECHANISM, WITH A CYCLIC MOVEMENT, FOR CONTROLLING A NUCLEAR REACTOR

[75] Inventors: Jean Martin, Chatillon; Jacques Jolly, Igny, both of France

[73] Assignee: Framatome, Courbevoie, France

[21] Appl. No.: 160,424

[22] Filed: Jun. 17, 1980

[30] Foreign Application Priority Data

Jun. 18, 1979 [FR] France ................... 79 15572

[51] Int. Cl.³ .............................. G21C 7/00
[52] U.S. Cl. ................................. 376/228
[58] Field of Search ............ 176/36 R; 310/12–14

[56] References Cited

U.S. PATENT DOCUMENTS

| | | | |
|---|---|---|---|
| 2,780,740 | 2/1957 | Roman et al. | 176/36 R |
| 3,480,807 | 11/1969 | Downs et al. | 176/36 R |
| 3,486,095 | 12/1969 | Sherwood et al. | 176/36 R |
| 3,825,160 | 7/1974 | Lichtenberger et al. | 176/36 R |
| 3,882,333 | 5/1975 | DeWeese | 176/36 R |
| 3,902,963 | 9/1975 | Bertone et al. | 176/36 R |
| 3,941,653 | 3/1976 | Thorp | 176/36 R |
| 3,946,258 | 3/1976 | Leshem | 176/36 R |

*Primary Examiner*—Sal Cangialosi
*Attorney, Agent, or Firm*—Pollock, Vande Sande & Priddy

[57] ABSTRACT

A finger mechanism for controlling vertical displacement of a neutron-absorbing assembly in a nuclear reactor for power adjustment and emergency shut-down of the reactor comprises two hooks each having a body carrying pivotable fingers which are engageable in circular notches provided in a control bar which supports the neutron-absorbing assembly from its lower end. The hook bodies are movable vertically relative to the control bar in opposite directions to alternately engage and move the control bar vertically. The fingers are pivoted synchronously with movements of the hook bodies and movements of the hook bodies and fingers are controlled by rotatable cams driven by a common drive so that the control rod is displaced in a continuous movement during rotation of the cams. Means are provided for maintaining the cams controlling the fingers in operative position, said means being releasable for causing all the fingers to release the control bar so that the neutron-absorbing assembly suspended from the control bar can drop immediately into a position of maximum engagement for shut-down of the reactor.

4 Claims, 3 Drawing Figures

FINGER MECHANISM, WITH A CYCLIC MOVEMENT, FOR CONTROLLING A NUCLEAR REACTOR

The invention relates to an improved finger mechanism, with a cyclic movement, for controlling a nuclear reactor by displacing a neutron-absorbing assembly, which is movable vertically in the nuclear reactor, for power adjustment and emergency shut-down of the reactor.

In nuclear reactors, power adjustment and emergency shut-down of the reactor are generally achieved by inserting neutron-absorbing assemblies, referred to as control rods and consisting of tubes containing a strongly neutron-absorbing material, inside the core.

Power adjustment is achieved by means of gradual displacements of the control rods in order to increase their insertion into the reactor core if it is desired to reduce the power, or on the contrary, by means of displacements aimed at reducing the insertion of the control rods if it is desired to increase the power.

These displacements of the control rods inserted in the vertical direction from the upper part of the core take place downwards in the first case and upwards in the second case.

In the case where emergency shut-down is triggered, the control rods are generally caused to fall under gravity until they reach their position of maximum engagement in the core.

The control rods are generally displaced by means of mechanisms located in the upper part of the reactor in engagement with a control bar extending the absorbing assemblies upwards, in a zone distant from the reactor core.

One type of mechanism in current use comprises two hooks each comprising a body supporting a set of fingers which are pivotable about horizontal axes and are adapted to be brought into engagement, by engagement mechanisms, with circular notches provided at regular intervals in the vertical direction on the control bar, for supporting the control bar and the absorbing assembly which is connected to the lower part of the control bar.

A first one of the two hooks can be actuated by means of a lifting device which enables it to lift the absorbing assembly when the pivoting fingers of the first hook are engaged with the control bar at the level of a circular notch provided in the bar.

When the lifting movement, which is of limited amplitude, of the first hook has ended, the second hook, which was in the released position, that is to say with its pivoting fingers separated so as to allow vertical movement of the bar, returns to a position in which the fingers come closer together, with the result that, when the first hook releases the bar, the bar comes to rest on the second hook.

The first hook then returns to its initial position, which it occupied at the start of its lifting movement, and its pivoting fingers are re-engaged in a notch in the control bar.

After the release of the fingers of the second hook, the first hook then transports the control bar upwards over a path of identical length to the previous path.

The lowering movements are carried out by means of virtually identical operations, the only difference being that the first hook grips the bar in its upper position and returns empty, after releasing the bar, along a path directed upwards.

To allow the control rods to fall under gravity during emergency shut-down, the fingers of both hooks can be released simultaneously.

In known devices of this type, the displacement movement of the first hook, and also the engagement movements of the pivoting fingers, are achieved by use of electromagnets which are excited sequentially as a function of the required displacement.

The displacements are stepwise displacements, the control bar and the absorbing element being stopped at the end of each unit movement. Furthermore, the displacements of the control bar and the engagement and disengagement movements of the pivoting fingers carried out by means of electromagnets are very abrupt, and this has certain disadvantages.

Apart from the disadvantages associated with the fact that these devices generate shocks and large dynamic forces in the confining structure, the wear on the pivoting fingers and on the notches in the bar can cause the loss of function in the case of very frequent functioning of these mechanisms when they are used for controlling the reactor.

Furthermore, it is not possible to position the control rod with a better precision than the length of a step of the discontinuous movement, that is to say the distance between two notches in the control bar.

The displacements of the control bar are thus determined as the number of steps made by the displacement device.

It is an object of the invention to provide a finger mechanism, with a cyclic movement, for displacing a neutron-absorbing assembly which is movable vertically in a nuclear reactor for power adjustment and emergency shut-down of the reactor, which mechanism makes it possible to ensure a continuous movement of the absorbing assembly inside the reactor core and the precise stopping, at any level of the stroke height, of the absorbing assembly in the reactor core, and to avoid the shocks produced by the known pivoting fingers.

According to the invention there is provided a finger mechanism, with a cyclic movement for controlling a nuclear reactor by displacing a neutron-absorbing assembly which is movable vertically in the reactor for power adjustment and emergency shut-down, said mechanism comprising a vertical control bar from the lower part of which the neutron-absorbing assembly is to be suspended and which is provided in its lateral surface with a plurality of circular notches at regular intervals in the vertical direction; two hooks each comprising a body supporting a set of fingers which are pivotable about horizontal axes between disengaged positions and engaged positions in which said fingers are engaged in a selected one of said plurality of notches in said vertical control bar; lifting and lowering means for the vertical displacement of said control bar and of the absorbing assembly when suspended therefrom, said lifting and lowering means comprising a first cam rotatable about the vertical axis of said control bar for simultaneously controlling vertical displacement of said two hook bodies for moving one of said hook bodies in an upwardly direction and the other of said hook bodies in a downwardly direction, the displacement of said hook bodies having an amplitude equal to n/2 times the distance between adjacent notches in said control bar, n being an integer; means for causing rotation of said first cam; means for causing said pivotable fingers to move between said engaged and said disengaged positions comprising second cams which are rotatable about said vertical axis of said control bar by said means for causing said rotation of said first cam, and members in engagement with said second cams for controlling said pivotable fingers to cause said fingers of one of said sets to move to their disengaged position and to cause said fingers of the other of said sets to move to their engaged position in a notch in said control bar at the moment when said hook bodies end their vertical displacements in one direction and the other, with inversion of said directions of said two hooks, so that in use said control bar and the absorbing assembly when suspended therefrom are displaced in a continuous movement by said hooks during rotation of said first and second cams; and a supporting and holding device for maintaining said second cams in operating position for operating said sets of fingers, said supporting and holding device being instantly releasable for bringing said second cams to an inoperative position in which all said fingers are in their disengaged positions so that said control rod can drop the absorbing assembly suspended therefrom into a position of maximum engagement in the nuclear reactor core.

An embodiment of a device for displacing a control rod according to the invention, applied to a pressurised water nuclear reactor, will now be described, by way of an example only, with reference to the attached drawings.

In the drawings:

FIG. 1 shows the central part of a mechanism for displacing the control rods and comprising all the means for engaging pivoting fingers thereof in notches in the control bar 1, and the means for lifting and lowering the control bar.

The control bar 1, which is of general cylindrical shape with a circular cross-section and is very long, is arranged at the central part of the mechanism along the axis of the mechanism, which axis is itself located in the extension of the vertical axis 2 of the control rod, the latter not being shown.

At its lower part, which is not shown, the control bar 1 comprises a coupling head which enables it to be connected to the upper part of the absorbing assembly which is arranged vertically in the nuclear reactor core.

The vertical movements of the control bar 1 in one or other direction thus cause movement of the absorbing assembly inside the core. If the vertical movement of the control bar 1 takes place upwards, the control rods are extracted from the core so that the power released by the core increases. Conversely, when the movement of the control bar takes place downwards, the control rods are inserted more deeply into the core.

A large number of control rods are arranged inside the core and their successive or simultaneous movements make it possible to regulate the power released by the core.

The control bar 1 is provided with notches 3 in its lateral surface, which notches are regularly spaced apart in the vertical direction, that is to say in the direction of displacement of the control bars and control rods, by a distance a.

The assembly comprising the mechanism for displacing the control bar 1 and the control rods is enclosed in a cylindrical pressure-resistant casing 5 which is fixed to the upper part of the nuclear reactor vessel to allow the passage of the control bars towards the reactor core.

Figure 1:
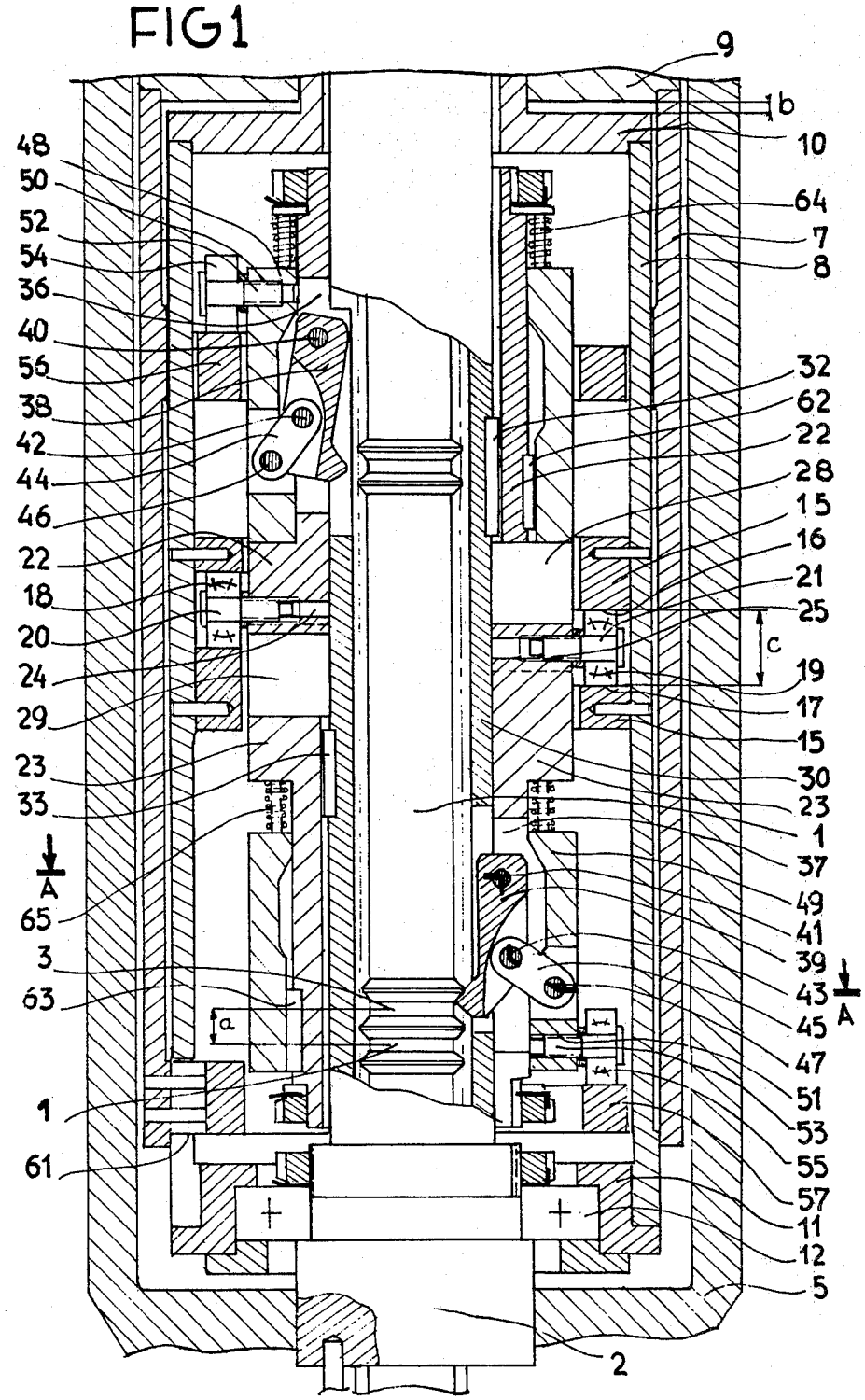
FIG. 1 is a sectional view through a vertical plane of symmetry of the central part of a control rod displacement mechanism comprising means for engaging the pivoting fingers and for lifting and lowering the control rod.

Only the lower part of this casing, containing the mechanism for displacing the control bars, has been shown in FIG. 1.

Two shells 7 and 8, which are coaxial relative to the cylindrical casing 5 and to the control bar 1, are arranged inside the casing 5.

The assembly comprising the two shells 7 and 8 is rotatable about the vertical axis common to the control bar, the shells and the casing 5 by a drive means which is located at the upper part of the casing 5 and is not shown in FIG. 1.

The drive means for rotating the shells 7 and 8 may comprise a motor located outside the casing 5 at its upper part, and a magnetic coupling connected to the upper part of the shells 7 and 8 in order to cause them to be rotated by the motor through the leaktight upper part of the enclosure.

The shells 7 and 8 comprise facing shoulders 9 and 10 respectively which are separated by a space of height b, this distance b representing the control stroke for emergency shut-down.

For normal operation of the mechanism as shown in FIG. 1, the external shell 7, or control shell for emergency shut-down, is suspended above the internal shell 8, or displacement shell, by operation of a control coil, which is not shown and which is arranged around the upper part of the casing 5, this coil, when energised magnetising a magnetic piece fast with the shell 7, and an opposed magnetic piece which is fast with the shell 8 at its upper part. When the control coil for emergency shut-down is supplied with current, the two magnetic pieces are held against one another by virtue of the magnetising force, and the two shells 7 and 8 are held together spaced apart by the distance b.

The internal shell 8 rests by a lower part 11 on a rotary stop 12 which supports the internal shell in the axial direction.

When the supply of current to the control coil is interrupted for emergency shut-down, the external shell 7 falls by the distance b, relative to the internal shell 8, the two shoulders 9 and 10 coming into contact. For this purpose, the external shell 7 is mounted for axial translational movement relative to the internal shell 8, the displacement being limited, however, to a displacement of amplitude b.

The internal shell 8, or displacement shell, carries, on its internal surface, a lifting and lowering cam 15 which is rigidly fixed thereto.

In reality, this cam is a double cam comprising two actuating surfaces 16 and 17 consisting of sectors of helical ramps.

The ramps of the surfaces 16 and 17 are identical and are offset by a distance c along the axis of the mechanism, rollers 18 and 19, of diameter c, being simultaneously in contact with the two actuating surfaces 16 and 17 of the double cam 15.

The rollers 18 are mounted for rotation on axles 20, arranged radially and spaced apart by 120° relative to one another in the lower part of the cylindrical body 22 of an upper hook.

The rollers 19 are mounted for rotation on axles 21, arranged radially and spaced apart by 120° on the cylindrical body 23 of a lower hook.

The axles 21 are fixed, by screwing, in tapped holes 25 in the upper part of the body 23 of the lower hook and arranged to be offset by 60° relative to the adjacent axles 20.

The hook body 22 is provided with notches 28 at the level of the parts of the lower hook body 23 which carry the rollers 19.

In the same manner, the lower hook body 23 is provided with notches 29 opposite the parts of the upper hook body 22 which carry the rollers 18.

In this manner, the hook bodies, in their positions closest to one another, can overlap one another. The device is thus more compact in the vertical direction.

The hook bodies 22 and 23 are mounted for vertical translational movement on a guide tube 30 coaxial with the control bar 1. For this purpose, the guide tube comprises slides 32 and 33 opposite the hook bodies 22 and 23 respectively.

The upper hook body 22 is provided with a plurality of apertures 36, inside each of which a finger 38 is mounted, each finger 38 being pivotable about a horizontal axle 40 fast with the upper hook body 22.

Each finger 38 also carries an axle 42, on which a link 44 is articulated, the latter being articulated at its other end on an axle 46 fast with an engagement sleeve 48 which constitutes, together with the links 44 the means for controlling the pivoting fingers 38. The upper hook body comprises three pivoting fingers, constituting the means for gripping the control bar 1 at the level of the upper hook.

The lower hook body 23 (FIGS. 1 and 2) is provided with a plurality of apertures 37, inside which a set of fingers 39 is fixed, the fingers 39 being mounted for rotation on axles 41 fast with the hook body 23.

Figure 2:
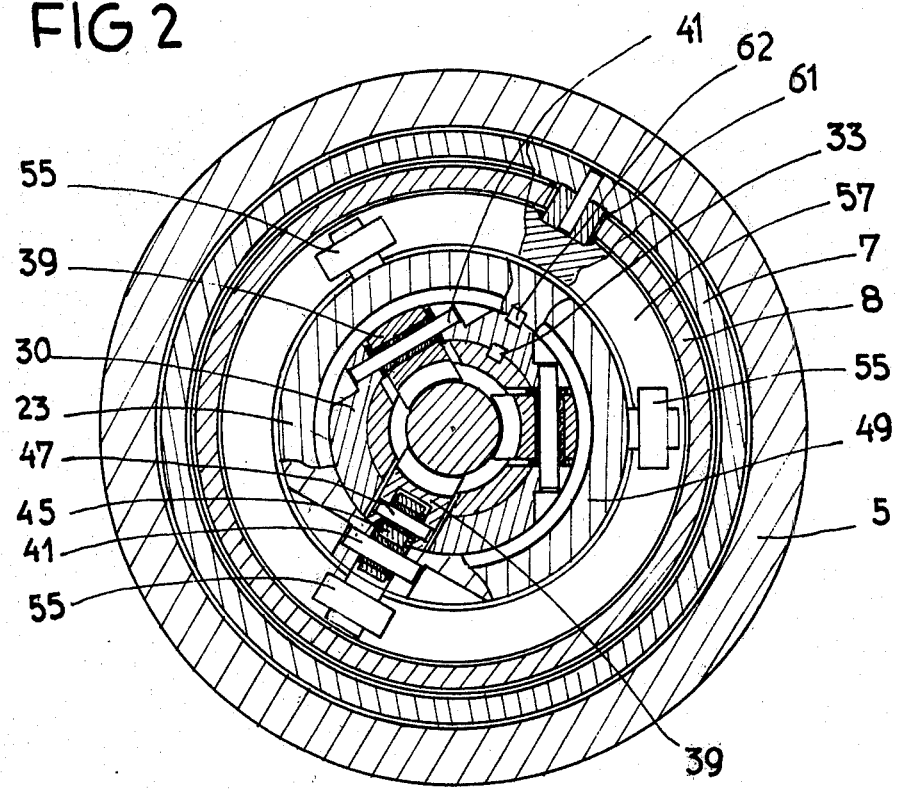
FIG. 2 is a sectional view along the line A—A in FIG. 1.

As shown in FIG. 2 three fingers 39 are arranged on the periphery of the hook body 23, spaced by 120° relative to one another.

An axle 43 is also fixed to each of the pivoting fingers 39, and a link 45 is articulated about each axle at one of its ends, the other end of the link being articulated on an axle 47 fast with an engagement sleeve 49 which constitutes, together with the links 45, the means for controlling the pivoting fingers 39.

The upper engagement sleeve 48 is provided, at its upper part, with three tapped holes 50, inside which three axles 52 are fixed, each of which carries a rotatable roller 54 resting on an annular cam 56, which constitutes the means for engaging the fingers of the upper hook, cooperating with the means for controlling the fingers which comprises the engagement sleeve and the links. The active surface of the cam 56 consists of a helical ramp.

In the same manner, the lower engagement sleeve 49 is provided, at its lower part, with three tapped holes 51, inside which three axles 53 are fixed by screwing, each of which axles carried a rotatable roller 55 resting on an annular cam 57 which is rigidly fixed, as shown in FIGS. 1 and 2, to the external sleeve 7, inside notches, such as 61, provided in the internal sleeve 8, and the active surface of which is a helical ramp.

In the same manner, the upper annular cam 56, which constitutes the means for engaging the upper hook, is rigidly fixed to the external sleeve 7, or emergency shut-down sleeve, inside notches made in the internal sleeve 8 and permitting an axial translational displacement of the engagement cam and of the emergency shut-down sleeve, relative to the internal sleeve, or displacement sleeve.

The cam 57 constitutes the means for engaging the pivoting fingers of the lower hook, the engagement sleeve 49 and the links 45 constituting the means for controlling the lower pivoting fingers.

The upper engagement sleeve 48 is mounted for vertical translational movement on the upper hook body 22 by means of slides 62, and is held in its low position by means of springs, such as 64, bearing on the upper part of the hook 22.

In the same manner, the engagement sleeve 49 is mounted for vertical translational movement on the lower hook body 23 by means of slides 63, and is held in its lower position by means of springs, such as 65, bearing on the upper part of the hook body 23.

Figure 3:
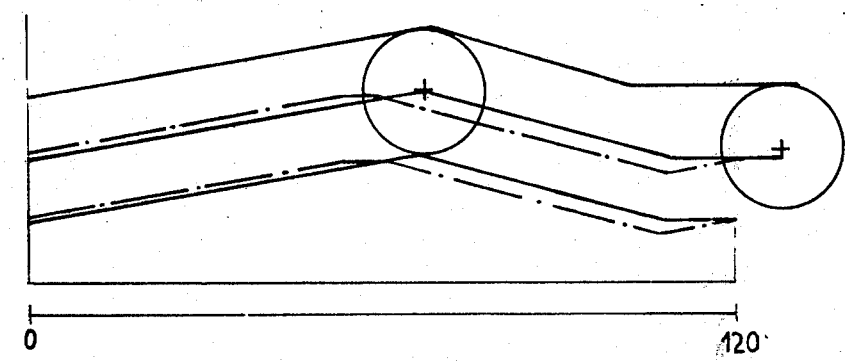
FIG. 3 shows the developed profile of cams of the engagement means and of the lifting means.

Reference to FIG. 3 shows the developed profile (represented by solid lines) of the cams 56 and 57 for engaging the pivoting fingers and the developed profile (represented by dot-and-dash lines) of the displacement cam 15, for rotation of these cams through 120°.

The profile repeats itself in an identical manner with a periodicity of 120° and the total developed profile of the cams would therefore be represented by a diagram which repeats the diagram shown in FIG. 3 three times.

In FIG. 3, the vertical movement caused by the cam is shown on the ordinate and the angle of rotation of the cam, and the position of a point on the perimeter of the cam, is shown on the abscissa.

It will be seen that the first part of the stroke of the cam causes a vertical movement of the devices resting on the cams, which movement is identical for the two engagement cams and for the displacement cam.

In this manner, and assuming that the lower hook is in the engaged position, an shown in FIG. 1, with the rollers 19 in the position at a start of the movement on the displacement cam 15 at the origin of the angles of rotation, a 60° rotational movement of the cam 15 causes the continuous raising of the lower hook body 23, whilst the engagement sleeve 49 undergoes a uniform vertical movement of the same amplitude as the vertical movement of the hook body 23.

In this manner, the engagement sleeve 49 does not undergo any displacement relative to the hook body 23, and the links 45 remain in the position shown in FIG. 1, holding the fingers 39 in their engagement positions.

The control bar driving the control rod inside the reactor core is thus raised by a certain height in the vertical direction, corresponding to the total stroke of the hook body 23.

Simultaneously, the hook body 22, the rollers 18 of which are offset by 60° relative to the rollers 19, travels over the descending part of the cam shown on the right-hand part of FIG. 3.

Assuming that the movement is damped and that the fingers 38 are in their open positions shown in FIG. 1, the engagement cam 56 causes a descending movement of the engagement sleeve 48, which is identical to the descending movement of the hook body 22. In this manner, the pivoting fingers 38 remain in the open position, as shown in FIG. 1. The pivoting fingers 38 do not therefore hinder the rising movement of the bar, which is caused by the fingers 39 in the engagement position.

At the moment when the upward movement of the hook body 23 and the downward movement of the hook body 22 come to an end, it is seen, on referring to FIG. 3, that the downward movement of the engagement sleeve 49, which is caused by the engagement cam 57, is damped before the downward movement of the hook body 23, under the effect of the displacement cam 15, is itself damped.

This results in displacement of the engagement sleeve 49, relative to the hook body 23, which displacement is caused by the springs 65, so that the links 45 undergo rotation about the axles 47, which causes the opening of the fingers 39 by rotation about the axles 41. The three pivoting fingers 39 thus open simultaneously and gradually, when the control bar ends it upward movement.

Simultaneously, as shown in FIG. 3, the rising movement of the engagement sleeve 48 is damped before the hook body 22 has totally ended its downward stroke.

In this manner, the engagement sleeve 48 is displaced upwards, relative to the hook body 22, with the result that the links 44 rotate about the axles 46 and cause the engagement of the pivoting fingers 38 in a notch 3 in the control bar.

The pivoting fingers 38 and 39 each comprise an engagement part, the shape of which corresponds to the shape of the notch 3 in the control bar, as shown in FIGS. 1 and 2, and the amplitude of the displacement of the hook bodies is equal to the distance a separating two notches in the control bar.

In this manner, at the end of the movement of the two hooks, with inversion of the direction of the displacement, the pivoting fingers are at the level of a notch, at the moment when they come into the engagement position, and can come into engagement on the control bar.

The design of the engagement and lifting the lowering cams enables one of the hooks to engage and the other hook to disengage, with a good centinuity and a sufficient overlapping of engagement and release.

In this manner, the movement of the control bar and hence of the control rod is continuous.

If it is desired to effect an emergency shutdown, that is to say a sudden reduction in the power released by the reactor core, by dropping the control rods into their positions of maximum engagement inside the core, it suffices to cut off the supply of current to the control coil for emergency shut-down. This causes the shoulder 9 of the external sleeve 7 to fall onto the shoulder 10 of the internal sleeve 8 and causes the engagement cams 56 and 57 to move rapidly downwards.

The rollers 54 and 55, no longer being supported by the cams 56 and 57 respectively, cause the engagement sleeves 48 and 49 to fall under the effect of the springs 64 and 65. The set of fingers of the hook in the open position remains in the open position and the set of fingers of the hook in the closed position abruptly comes into the open position, with the result that the control bar is no longer supported and falls under gravity, driving the control rod downwards into its position of maximum engagement in the reactor core.

It is seen that the main advantages of the mechanism described above are to ensure a continuous movement of the absorbing assembly and to permit the precise stopping of the control bar, and hence of the absorbing assembly which is attached thereto, at any level of the stroke height, because, in order to stop the bar at any level, it suffices to stop the drive means causing rotation of the shells 7 and 8.

In order to satisfactorily hold the control bar in position, it is moreover desirable to use a braked motor for rotating the shells 7 and 8. The control bar is held in position in a rigid manner without the consumption of energy other than the energy for exciting the control coil for emergency shut-down, which coil must be supplied with current in order to hold the engagement cams in a position such that the rollers of the engagement sleeves are in contact with these cams. The cams of the engagement mechanism are then held, by means of the electromagnet for emergency shut-down, in the operating position, in which they can be made to function as engagement control mechanisms by simply causing the cams to rotate.

A further advantage of the above described mechanism is that it enables the hooks to take charge gradually, and to avoid shocks, noises, wear and vibrations.

Furthermore, as in the devices of the prior art, the bulk of the mechanism is independent of the total stroke of the device, because the control bar is driven by means of hooks which cover a small fraction of the total path. In the case of regulation, as in the case of emergency shut-down, only the central control bar of small diameter moves with the control rod and, in this case, the volume of water displaced is low, the passage through the lid is of small diameter and it is still possible to insert detection devices above the mechanisms, for example in order to know the position of the bar, that is to say of the control rod. Likewise, a further advantage is that the inertia to be damped in the event of emergency shut-down is low and that only the control bar accompanies the rod at the moment when the latter falls. Furthermore, the mechanism only uses the external part of the bar, and the interior of the control bar is thus free for controlling the coupling with the control rod.

Furthermore, the control bar is free to rotate, and this simplifies the operations for mounting the bar with the control rod.

After an emergency shut-down, when it is desired to resume normal operation of the reactor, during which regulation must be effected by controlled displacement of the control rods, it is necessary for the hooks to take charge of the control bar again.

A difficulty can arise from the fact that the pivoting fingers of the hook, which is desired to bring into engagement position in a notch in the control bar, may not be opposite a notch when the control coil for emergency shut-down has been re-excited to bring the shell 7 for emergency shut-down back into its raised position and the engagement cams back into the operating position.

It then suffices to supply the coil for emergency shut-down with current at a voltage which is greater than the normal supply voltage in the case of regulation of the reactor, and this makes it possible to bring the engagement cams of the hooks back into position. The excitation of the control coil for emergency shut-down is then reduced to its value for regulation of the reactor, which suffices to keep the hooks engaged when the coupling poles are in contact. If the fingers are in abutment with the control rod intermediate two notches, the resulting gap between the coupling poles then causes the engagement cam to fall. A 30° rotation of the cams is then effected, which corresponds to a rise of half the distance between two notches, so that in the event where the fingers are intermediate two notches before the 30° rotation of the engagement cams, these fingers are opposite a notch at the end of the movement of the cams.

It then suffices to re-excite the coil at a high voltage and, finally, definitively to bring the excitation of the coil back to its regulation value.

The normal displacements for the regulation of the reactor can then be resumed.

However, the invention is not intended to be limited to the embodiment which has now been described, but includes all variants thereof.

Thus, while in the embodiment which has been described the engagement and disengagement means for the pivoting fingers consist of rotatable cams, the actuating surfaces of which, in the shape of helical ramps, are virtually perpendicular to the axis of the control bar, engagement cams may alternatively be used which can rotate about the axis of the control bar, and the active surfaces of which consist of radially directed bosses projecting relative to a cylindrical surface, the axis of which is the axis of the control bar, such a cam cooperating with rollers fast with the pivoting fingers, which are returned to their disengagement positions by means of springs.

However, with the fingers being displaced with the hooks in the vertical direction, it is necessary to incline the rollers according to the slope of the active stroke of the displacement cam, so as to ensure frictionless rolling.

In this embodiment, the shell for emergency shut-down keeps the projecting bosses of the engagement cams in the active position. These bosses are machined from pieces which are independent of the cylindrical body of the cam and which are mounted so that they can tilt relative to the cylindrical part of the cam. The springs exert a separating force on the pivoting fingers in order to keep them in the open position, and the shell for emergency shut-down acts on the bosses of the cam in order to keep them in the active position despite the action of the pivoting fingers, which tends to separate them.

When the supply of current to the coil for emergency shut-down is interrupted, the sleeve falls through a short vertical distance and presents, opposite the external surface of the tiltable parts of the cam, notches which enable this cam and the pivoting fingers to disengage and enable the control bar and the control rod to fall.

In the embodiment which has been described, the useful stroke of each hook was exactly equal to the length a, that is to say to one notch step. In this embodiment, each hook now uses only one notch in two during the displacements. It can be desirable for each hook to pass through all the notches successively, and, in this case, it suffices to provide a useful stroke of the hook which is equal to a/2, that is to say equal to half a notch step.

More generally, it would theoretically be possible to choose a useful stroke of each hook which is equal to $(n/2) \times$ the notch step a, it being assumed that n is an integer.

In fact, it is the requirements associated with the mechanism which make it possible to make a choice. These requirements can be associated with the available diametral bulk of the displacement device, this diametral bulk limiting the useful stroke on the ramps of the cams if the slope is assumed constant. The forces to be transmitted in contact with the pivoting fingers and the notches can constitute another requirement. Finally, another requirement can be associated with the desired life of the mechanism.

The mechanism described above is described in relation to the regulation and the emergency shut-down of pressurised water nuclear reactors, but it is equally applicable to the displacement of the absorbing assemblies in all types of nuclear reactors comprising a core inside which these absorbing assemblies are displaced in order to adjust the power of the core or in order suddenly to reduce it during emergency shut-down.

We claim:

1. A finger mechanism, with a cyclic movement, for controlling a nuclear reactor by displacing a neutron-absorbing assembly which is movable vertically in the reactor for power adjustment and emergency shut-down, said mechanism comprising:

a vertical control bar from the lower part of which the neutron-absorbing assembly is to be suspended and which is provided in its lateral surface with a plurality of circular notches at regular intervals in the vertical direction;

two hooks each comprising a body supporting a set of fingers which are pivotable about horizontal axes between disengaged positions and engaged positions in which said fingers are engaged in a selected one of said plurality of notches in said vertical control bar;

lifting and lowering means for the vertical displacement of said control bar and of the absorbing assembly when suspended therefrom, said lifting and lowering means comprising a first cam rotatable about the vertical axis of said control bar for simultaneously controlling vertical displacement of said two hook bodies for moving one of said hook bodies in an upwardly direction and the other of said hook bodies in a downwardly direction, the displacement of said hook bodies having an amplitude equal to n/2 times the distance between adjacent notches in said control bar, n being an integer;

means for causing rotation of said first cam;

means for causing said pivotable fingers to move between said engaged and said disengaged positions comprising second cams which are rotatable about said vertical axis of said control bar by said means for causing said rotation of said first cam, and members in engagement with said second cams for controlling said pivotable fingers to cause said fingers of one of said sets to move to their disengaged position and to cause said fingers of the other of said sets to move to their engaged position in a notch in said control bar at the moment when said hook bodies end their vertical displacements in one direction and the other, with inversion of said directions of said two hooks, so that in use said control bar and the absorbing assembly when suspended therefrom are displaced in a continuous movement by said hooks during rotation of said first and second cams; and a supporting and holding device for maintaining said second cams in operating position for operating said sets of fingers, said supporting and holding device being instantly releasable for bringing said second cams to an inoperative position in which all said fingers are in their disengaged positions so that said control rod can drop the absorbing assembly suspended therefrom into a position of maximum engagement in the nuclear reactor core.

2. A mechanism according to claim 1, wherein:

said two hooks are arranged one on each side of said first cam with one of said hooks being in an upper position and the other of said hooks being in a lower position, said first cam comprising two actuating surfaces comprising generally identical helical ramps coaxial with said control bar, one said actuating surface being directed upwardly and the other said actuating surface being directed downwardly;

each of said two hooks carries a set of rollers with horizontal axes which are simultaneously in engagement with a respective one of said two actuating surfaces of said first cam;

said second cams each comprise an actuating surface comprising a helical ramp which is generally identical to said ramp of said actuating surface of said first cam which is directed upwardly; and actuating means for each said set of fingers comprise an engagement sleeve which is vertically movable on said respective hook body, and links connecting said engagement sleeve in an articulated manner to said fingers of said respective set of fingers, each said engagement sleeve bearing on a respective said second cam by rollers with horizontal axes, the profiles of said ramps of said second cams being designed, in accordance with the profiles of said ramps of said first cam, so as to cause displacements of said engagement sleeves which are simultaneous and identical to displacements of the corresponding said hooks, over the greater part of said displacement during which said pivoting fingers remain in said engaged position for one of said hooks and in said disengaged position for the other of said hooks, and differential displacements of said engagement sleeves, relative to said hook bodies, at the end of the displacement of said hook bodies, said differential displacements causing movement of said fingers of said one hook to their disengaged position and movements of said fingers of said other hook to their engaged positions.

3. A mechanism according to claim 2, wherein said first cam is rotatable about said axis of said control bar by means of a cylindrical displacement shell coaxial with said control bar, and in which said first cam is fixed, and said second cams are arranged on the internal surface of a control shell for emergency shut-down, said control shell being coaxially arranged on the outside of said displacement shell, notches in said displacement shell permitting vertical displacement of said control shell for emergency shut-down and of said second cams, relative to said displacement shell, when the supply of current to a magnetic coil, ensuring the coupling of said shells by means of magnetisation, is interrupted.

4. A mechanism according to either claim 2 or claim 3, wherein each of said hooks carries a set of three rollers in engagement with said respective actuating surfaces of said first cam, said horizontal axes of said rollers being radially directed and offset by 120°, said set of rollers of one said hook being offset by 60° relative to said set of rollers of said other hook, said actuating surfaces of said first cam comprising three identical parts which are arranged in succession and which act simultaneously with two rollers which are offset by 60° and are carried by the respective hooks.

* * * * *